Figure 1:
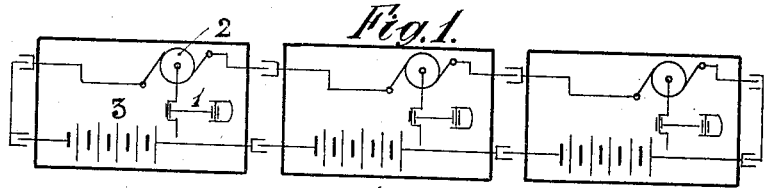

H. PIEPER.
ELECTROMECHANICAL PROPULSION SYSTEM FOR TRAINS.
APPLICATION FILED JUNE 8, 1912.

1,056,119.

Patented Mar. 18, 1913.

2 SHEETS—SHEET 1.

Witnesses
L. H. Cadarr.
C. S. Brown

Inventor:
Henri Pieper
by Foster Freeman Watson & Coit
Attys

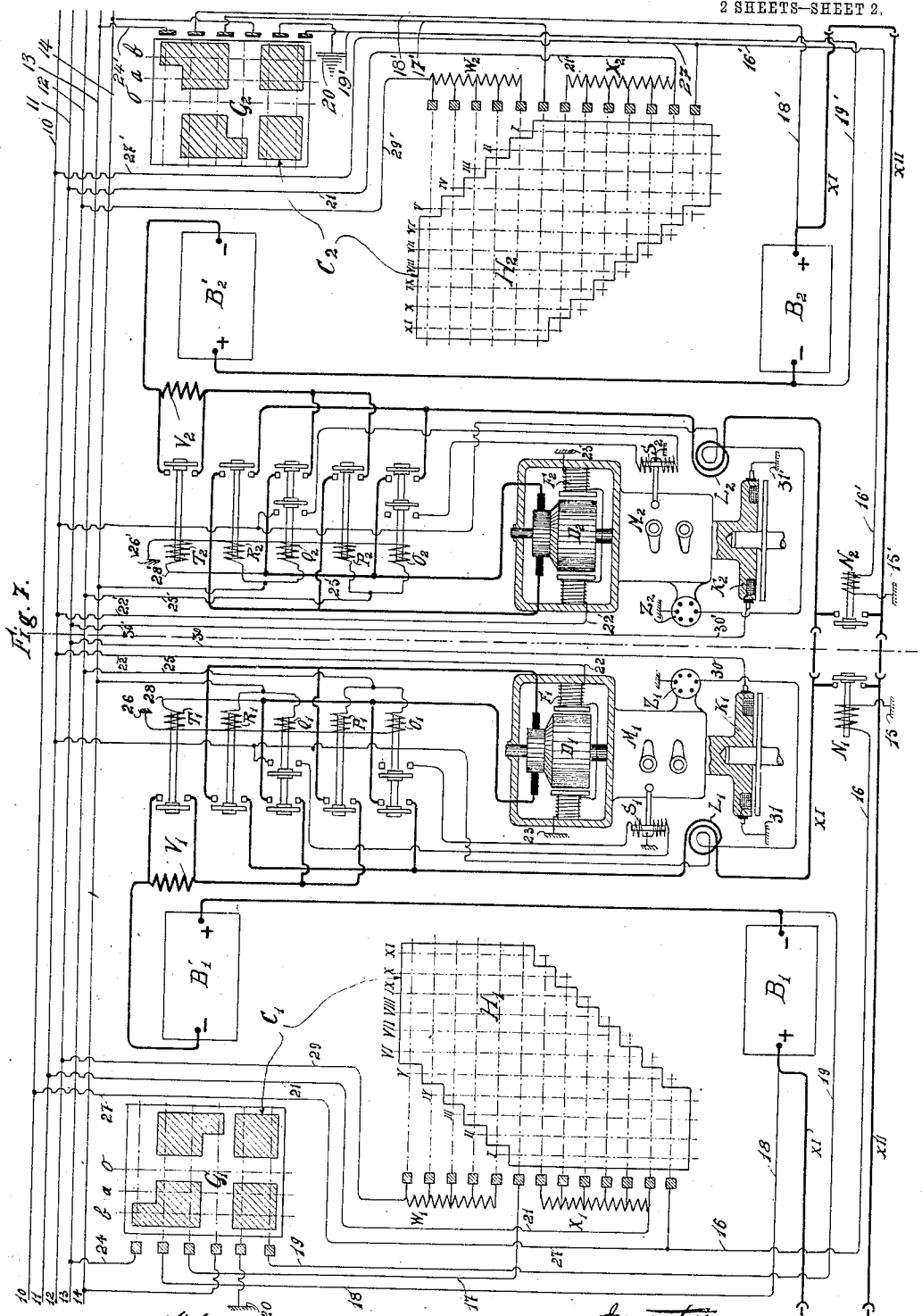

UNITED STATES PATENT OFFICE.

HENRI PIEPER, OF LIEGE, BELGIUM.

ELECTROMECHANICAL PROPULSION SYSTEM FOR TRAINS.

1,056,119.  Specification of Letters Patent.  Patented Mar. 18, 1913.

Application filed June 8, 1912. Serial No. 702,586.

*To all whom it may concern:*

Be it known that I, HENRI PIEPER, subject of the King of Belgium, residing at Liege, Belgium, have invented certain new and useful Improvements in Electromechanical Propulsion Systems for Trains, of which the following is a specification.

The present invention relates to a system of propulsion for trains composed of several vehicles, of the "mixed" or electro-mechanical type, comprising heat motors in combination with electric machines and batteries of accumulators.

As is well known in the "mixed" or electro-mechanical system, the heat motor directly drives the wheels by means of a magnetic or similar clutch, and by toothed gearing, while the electric machine is placed in parallel with the battery and coupled mechanically to the heat motor. The heat motor is generally dimensioned for average power so that the electric machine serves, when hills are encountered, to increase the power by working as a motor, and, as a generator, to store up energy during descents. In purely electric systems various systems of connections are known, for example the Sprague system, in which several vehicles are coupled together in order to form a single train and controlled from a single central point where the guard is stationed. It is, however, not possible to employ these methods of connection in electro-mechanical systems, since disadvantages are occasioned, which are not present in the purely electric system. If, for example, the different wheels of the vehicles have different diameters owing to unequal wear, or if the different electric machines possess different characteristics, various disadvantages result which the employment of series motors does not produce in the purely electrical system. It may happen that the batteries are unequally charged, that some cells of the battery are worn out very rapidly, and that the total motive power of the entire train is considerably reduced by an unequal utilization of the different machines. Similar disadvantages are present if the known connections, which serve to control a vehicle from one of several points, are employed when using shunt-wound motors. They are still more apparent in electro-mechanical systems; in this case the electric machines have to work alternately as motors and generators, this change in function being made rapidly, and it is known that in such cases it is difficult to obtain all the machines with the same characteristics. Moreover, the electrical machines do not work with the strongest field during the greater part of the time they are in service, but with a very weak excitation, so that it is nearly impossible to obtain the same characteristic for the electric machines. Finally, it is necessary to further consider, in regard to the purely electrical system, that the installation comprises batteries which are alternately charged and discharged, and that, owing to unequal charging and discharging currents, the premature destruction of the batteries is easily possible.

The object of the invention is a system of connections which obviates these disadvantages and which takes into account the peculiarities of the electro-mechanical system.

Figure 2:
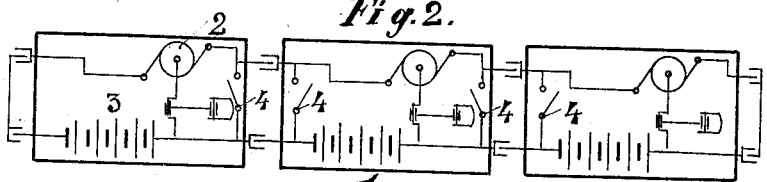
Figure 3:
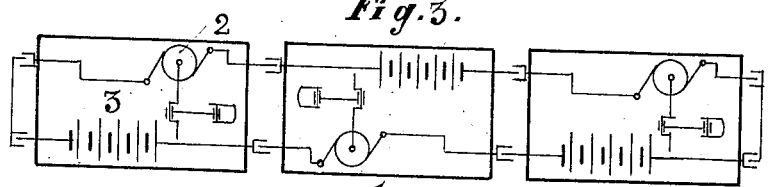
Figure 4:
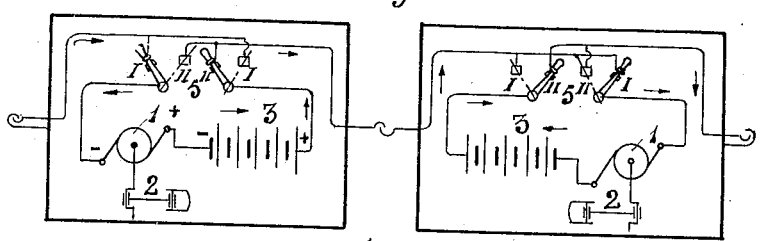
Figure 5:
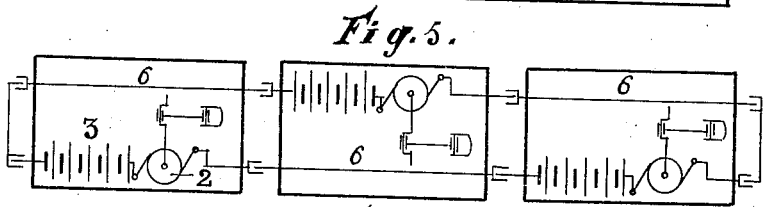
Figure 6:
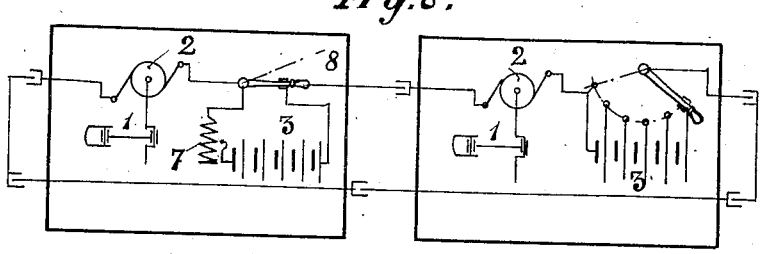

In the accompanying drawings, Figure 1 shows the different elements of the electro-mechanical propulsion system for a train having three vehicles in one form of connection according to my invention. Fig. 2 is a diagram comprising the same elements as Fig. 1, showing another form of connection according to my invention. Fig. 3 is a modification of the arrangement represented in Fig. 1. Fig. 4 is a diagram of another modification of my invention, showing a train of two vehicles and employing a simplification of the electrical coupling of the vehicles. Fig. 5 shows another embodiment of my invention in the case of a train of three vehicles and represents another manner of simplifying the electrical arrangement of each vehicle. Fig. 6 gives a modification of my invention, in which I show an arrangement to place in or out of circuit one or more of the batteries of the train. Fig. 7 represents a diagram showing in a completely detailed form the embodiment of my invention in the case of a train having two vehicles.

According to the invention the electrical machines and batteries of all the vehicles of the train are connected in series. In this manner unequal demand on the electric machines and also on the different batteries is prevented. This part of the system of connection, constituting the subject of the invention, is represented in Fig. 1, where 1 represents the heat motors, 2 the electric machines and 3 the batteries of the different vehicles. Obviously each vehicle can be provided with several electrical machines and several heat motors. The control of the entire train is effected, in the known manner, from the guard's van.

By employing series connections as in Fig. 1, there are still several disadvantages present, both when starting the different groups composed of heat motor and electric machines, and also when starting the vehicle itself by means of the clutch connecting the heat motors with the driving wheels. It may happen, for example, that one of the groups is running, while the other groups are still at rest.

According to Fig. 2, the invention provides for the employment, in addition to the series connection, of another connection in which the different groups of electric machines and corresponding batteries are independent of one another, each electric machine working only with its corresponding battery. With this object switches 4 are provided which allow the electric machines in each group to be connected with the battery 3 appertaining thereto. At the ends of the train switches are obviously not necessary owing to the presence of the end connections. The particular connections shown in Fig. 2 are particularly employed when starting the train. In order to define the period during which the two systems of connection are to be respectively employed, and to determine the right moment to change from the one to the other, it is necessary to especially take into account the weak field excitation existing during a large period of service in the electro-mechanical system, and the disadvantages resulting therefrom. The connection in separate groups will preferably only be employed so long as the field strength is a maximum, and the connections will then be changed when the speed is regulated by the variation of the field of the electric machines. If a magnetic clutch is employed which is introduced, in the known manner, between the motors and the wheels, the changing of the connections takes place, according to this invention, at about the same time as the magnetic clutches are switched in. The field excitation is, at this moment, at its maximum, and the electric machines can only work as motors and the battery as a source of energy.

The control of the train is effected by the arrangement in Fig. 2, in the following manner:—During the starting of the different power groups the switches 4 are closed and the system is divided into separate groups, so that each group starts independently of the others. The switches 4 still remain closed when starting the different vehicles of the train by the progressive switching in of the magnetic clutches. After the clutches have been completely put in circuit the switches 4 are opened, the field excitation of the electric machines being at this instant still at the maximum. The connection forming the separate groups is then changed into the series connection of the electrical equipment of the whole train. The series connection is retained for normal running, but obviously the connection in separated groups can be employed during normal running if desired. By this combination of the series connection and the connection in separate groups on the one hand there is obtained, a convenient starting of the different power groups and a certain starting of the whole train, and on the other hand, an unequal demand on the batteries and dynamos during normal running is avoided.

The method of realizing the connection in series as shown in Fig. 1, in which all the electric machines and all the batteries are placed directly one behind the other, can be modified so that the batteries and electric machines are placed in series alternately, as in Fig. 3. In this manner a reduction of the normal voltage is obtained. Fig. 3, compared with Fig. 1, shows also that the direction in which the different vehicles are placed in the train is of no importance, since neither direction alters the successive order of the electric machines and batteries in the series connection.

The arrangement can be simplified by connecting up the electric machines and the battery of each vehicle in a single conductor and employing the frame of the vehicle, that is to say, earth, as the second conductor. But to admit of the vehicles being placed in the train in either direction it is necessary to provide an automatic or hand-operated throw-over switch, which permits of putting the electric machine and battery in circuit always in the proper direction. Fig. 4 shows such a throw-over switch 5 which can be moved from position I to position II and vice-versa, according to the direction in which the vehicle is placed in the train.

When it is not desired to use the vehicle frame as the conductor for the return current, it is necessary to use, on each vehicle, a second special conductor in addition to that which contains the electric machine and battery. Fig. 5 represents such a system comprising a special conductor 6; a definite order of the electric machines and batteries is thus assured, whatever may be the direction in which the vehicle is placed in the train.

The connection in series is of particular importance in the case of the electro-mechanical system of propulsion, as it permits of putting in or out of circuit one or more of the electric machines and batteries, and, in consequence, renders it possible to regulate the speed within very considerable limits, the number of revolutions varying in proportion to the number of batteries not disconnected to the number of electric machines not disconnected. Supposing, for example, three electric machines and three batteries and a speed of 15 kilometers per hour, one can obtain, by placing the two batteries out of circuit, a speed of 3 kilometers per hour and, by placing the two electric machines out of circuit, a speed of 45 kilometers per hour; the normal speed can be thus varied in the proportion of 1 to 9 without taking into account the normal regulation of the speed by the variation of the magnetic field, which is possible in the proportion of 1 to 3 up to 1 to 10.

When placing the electric machines and batteries in and out of circuit, it is necessary to prevent sudden variations in the current and to effect the operation gradually; in the case of the electric machines this is accomplished by a variation of the field, which is reduced gradually to zero, and vice-versa; in the case of the batteries, with the same object, the different cells can be gradually placed in or out of circuit by employing (see the vehicle represented at the right hand side of Fig. 6) a hand switch or an auxiliary motor. The auxiliary motor is preferably arranged that it can run in both directions and so that it is dependent upon the strength of the current, thereby rendering a too rapid rise or fall of the voltage impossible. Instead of putting the cells progressively in or out of circuit, the introduction of a battery into the circuit can be effected by having in series with the battery a resistance which reduces the voltage. The resistance 7 (see the vehicle at the left hand side of Fig. 6) and the battery 3 can be short-circuited by means of a switch 8, the battery being out of action. In order to put the battery in circuit the switch 8 is first opened, automatically or by hand, and then the resistance 7 is gradually reduced until its value is zero. To put the battery out of circuit the reverse operation is accomplished by progressively inserting the resistance 7 and then closing the switch 8. Obviously the cutting in or out of the resistance can be made dependent on the strength of the current in order to prevent a too rapid variation of the voltage.

The control of the switches of the auxiliary motors, and of the other necessary appliances is effected in the well-known manner from a central situation, for example, from the guard's van. Fig. 7 represents this arrangement of the control showing by a detail diagram the connections forming the separated groups and the connections of the groups in series, in accordance with the invention, and in the case of a train composed of two vehicles. The two vehicles are equipped with the same apparatus, the elements being distinguished in the drawing by applying the indexes 1 or 2 to the letters of reference according to which vehicle the element is associated. The two vehicles are electrically connected to one another by two power lines XI, XII and by five auxiliary wires 10, 11, 12, 13, 14. The high tension lines XI, XII connect the batteries $B_1$, $B'_1$ and $B_2$, $B'_2$, and the rotors $D_1$ and $D_2$ of the electric machines and the gas regulators $L_1$ and $L_2$. The connection of the conductors XI, XII at the end of the train is preferably effected by hand. The low tension wires 10 to 14 receive their current from the battery of the control vehicle and supply the current to the exciting coils $F_1$, $F_2$ of the electric machines, to the magnetic clutches $K_1$ $K_2$, to the appliances $S_1$, $S_2$ for reversing the gas engines $M_1$ $M_2$, to the ignition magneto-machines $Z_1$, $Z_2$ and to the different controlling electro-magnets of the train. The magnets $N_1$ and $N_2$ serve to connect the electric machines with the corresponding battery. The magnets $O_1$, $P_1$ and $O_2$, $P_2$ respectively serve in one direction of running to connect in circuit the rotors $D_1$, $D_2$ of the electric machines and the magnets of the reversing arrangements $S_1$, $S_2$. The magnets $R_1$, $Q_1$ and $R_2$, $Q_2$ operate in a similar manner for the reverse direction of running. The magnets $T_1$ and $T_2$ respectively act to shortcircuit the starting resistances $V_1$, $V_2$ of the rotors $D_1$, $D_2$. The controllers $C_1$ and $C_2$, provided at the ends of the train and serving to control the vehicles, comprise respectively contact drums $G_1$, $G_2$ and $H_1$, $H_2$ specially combined for the object in view, the drums $G_1$ and $G_2$ serving to change the direction of running and the drums $H_1$ and $H_2$ serving to regulate the field of the electric machines and the magnetic clutches. For starting up the electric machines as well as for starting the vehicles, connections are employed forming separated groups, each of said groups comprising an electric machine and the corresponding battery; in effect, the placing in series of all the electric machines and all the batteries is not advantageous, because an unequal distribution of the voltage of the machines may result and in consequence a derangement of the electrical equilibrium. The excitation of the magnets $N_1$, $N_2$ for effecting the connection in separated groups, should be accomplished during the initial movement of the controller $C_1$ or $C_2$ at the same time as the field windings $F_1$, $F_2$ and the rotors $D_1$, $D_2$ are placed in circuit. The starting of the two power groups $M_1$, $D_1$ and $M_2$, $D_2$ is effected for instance by means of the controller $C_1$ in the following manner: The drum $G_1$ is brought in position $a$ according to the direction of running and the drum $H_1$ in position I. Consequently the field windings $F_1$, $F_2$ are excited via earth 20, drum $G_1$, line 19, battery $B_1$, line 18, drum $G_1$, line 17, drum $H_1$, line 21, 11 and then in parallel; on the one hand, in the first vehicle through line 22 and winding $F_1$ to earth 23 and on the other hand, in the second vehicle, through line $22^1$ and winding $F_2$ to earth $23^1$. The resistances $X_1$ are shortcircuited at this moment and the field of the electric machines is a maximum. Simultaneously the magnets $N_1$, $N_2$ are excited via earth 20, drum $G_1$, line 19, battery $B_1$, line 18, drum $G_1$, line 17, drum $H_1$ and then in parallel through line 16 to magnet $N_1$, earth 15, and through line 27, 10 $27^1$, $16^1$ to magnet $N_2$, earth $15^1$. The excited magnets $N_1$, $N_2$ close their relay contacts, whereby the connections forming separated groups is completed. The drum $G_1$ moved in position $b$, causes the excitation of the magnets $P_1$, $O_1$ and $P_2$, $O_2$; the current taking the following path: earth 20, drum $G_1$, line 19, battery $B_1$, line 18, drum $G_1$, line 24, 13 and then in parallel in the first vehicle through line 25 to magnets $O_1$, $P_1$ and earth 26, and in the other vehicle through line $25^1$ to magnets $O_2$, $P_2$ and earth $26^1$. The magnets $O_1$, $P_1$ and $O_2$, $P_2$ closing their relay contacts the two following independent circuits each including an electric machine and a battery are now formed: In the control vehicle: battery $B'_1$, resistance $V_1$, contacts of the relay $P_1$, armature $D_1$, contacts of the relay $O_1$, winding line $L_1$, line XI, contacts of the relay $N_1$, line XII, line XI, battery $B_1$; and in the second vehicle: battery $B'_2$, resistance $V_2$, contacts of the relay $P_2$, armature $D_2$, contacts of the relay $O_2$, winding $L_2$, line XI, line XII, contacts of the relay $N_2$, line XI, battery $B_2$. The resistances $V_1$ and $V_2$ are then shortcircuited respectively by means of the magnets $T_1$ and $T_2$ excited in derivation to the power lines respectively via line 28, magnet $T_1$, earth 26, and line $28^1$, magnet $T_2$, earth $26^1$. The electric machines now start as motors receiving current from the battery associated therewith and bring the thermal motors up to speed the reversing arrangements $S_1$ and $S_2$ being excited respectively over contacts of the relays $O_1$ and $O_2$ or $Q_1$ and $Q_2$ according to the direction of running. In this way the different groups of heat motors and electric machines start absolutely independently of one another. This independency is equally important for starting the whole vehicle. The excitation of the magnets $N_1$, $N_2$ must be maintained during the putting in circuit of the magnetic clutches $K_1$, $K_2$, which is effected by gradually shortcircuiting the resistances $W_1$ by moving the controller drum $H_1$ from position I to V, the magnets of the clutches $K_1$, $K_2$ being excited over the following path: earth 20, drum $G_1$, line 19, battery $B_1$, line 18, drum $G_1$, line 17, drum $H_1$, resistances $W_1$, line 29, 12 and then in parallel through line 30 to clutch $K_1$, earth 31, and through line $30^1$, clutch $K_2$, earth $31^1$. As already explained in connection with Fig. 2, the moment of changing from the connection forming separate groups to the placing in series of all the electric machines and batteries, is so chosen that the electric machines are at this instant still fully excited. The contact surface $H_1$ of the controller $C_1$ is combined in Fig. 7 so that in position V the field regulating resistances $X_1$ are still shortcircuited and the resistances $W_1$ of the clutches are not quite out of circuit, at the moment, when the magnets $N_1$ and $N_2$ are disconnected, the drum H leaving in position V the fixed contact of the lines 16, 27 including the magnets $N_1$ and $N_2$ and when consequently the change from the separated connections to the series connections is effected, the deënergized magnets $N_1$ and $N_2$ open their relay contacts. The series connection effected in position V of the controller $C_1$ includes the electric machines and batteries of the whole train in the following way: batteries $B_1$, $B'_1$, contacts of relay $P_1$, armature $D_1$, contacts of relay $O_1$, winding $L_1$, line XI, winding $L_2$, contacts of relay $O_2$, armature $D_2$, contacts of relay $P_2$, batteries $B'_2$, $B_2$ and back to batteries $B_1$, $B'_1$ through lines XII and XI. After the electric machines and batteries of the two vehicles have been placed in series the controller $C_1$ effects first the placing completely in circuit of the magnetic clutches $K_1$ and $K_2$, by shortcircuiting in position VI the rest of the resistances $W_1$, and then the regulation of the speed of the electric machines by varying the fields $F_1$ and $F_2$ by means of the resistances $X_1$ being gradually placed in circuit by moving the drum $H_1$ from position VI to XI. These resistances must obviously be dimensioned in the case of two vehicles so that the same exciting current corresponds to the position of the handle of the controller as in the case of a single vehicle.

In addition to the methods of carrying out the invention as described there can be obviously other modifications. For example instead of two vehicles as in Fig. 7 there can be three or more equipped according to the diagram given in this figure. Further, instead of magnetic clutches any other method of clutching for instance a mechanically operated clutch may be employed and it is evident that the type, construction and arrangement of the thermal motor, electric machines, batteries, controller and the other parts of my system might be widely varied without departing from the spirit and scope of my invention. Hence I would have it understood that I do not limit myself to the particular construction and arrangement of parts shown and described.

Having fully described my invention, what

I desire to claim and secure by Letters Patent is:—

1. An electro-mechanical propulsion system for trains having a plurality of vehicles, comprising heat motors, electric machines coupled thereto, batteries working in combination with the electric machines, means for connecting the electric machines and batteries of each vehicle in separate groups in order to start the different groups of heat motors and electric machines and to start the different vehicles of the train, means for connecting the electric machines and batteries of the whole train in series for running, means for regulating the speed by varying the field of the electric machines and means for changing from the one system of connection to the other at about the commencement of the speed regulation.

2. An electro-mechanical propulsion system for trains having a plurality of vehicles, comprising heat motors, electric machines coupled thereto, batteries working in combination with the electric machines, means for connecting the electric machines and batteries of each vehicle in separate groups, means for connecting the electric machines and batteries of the whole train in series, magnetic clutches between the motors and the driving wheels, resistances adapted to be gradually cut out in order to connect the clutches in circuit, and means for changing the connection in separate groups to the connection in series of the electric machines and batteries at about the moment when the clutches are fully connected in circuit.

3. An electro-mechanical propulsion system for trains having a plurality of vehicles, comprising heat motors, electric machines coupled thereto, batteries working in conjunction with the electric machines, said electric machines and batteries being arranged alternately along the length of the train, means for connecting the electric machines and batteries of each vehicle in separate groups, means for connecting the electric machines and batteries of the whole train in series, means for regulating the speed by varying the field of the electric machines, and means for changing from the one system of connections to the other at about the commencement of the speed regulation.

4. An electro-mechanical propulsion system for trains having a plurality of vehicles, comprising heat motors, electric machines coupled thereto, batteries working in conjunction with the electric machines, a single conductor running the length of the train containing the electric machines and batteries, a second conductor constituted by the vehicle frames, means for connecting the electric machines and batteries of each vehicle in separate groups, means for connecting the electric machines and batteries of the whole train in series, conductors at the ends of each vehicle, and a switch for connecting the ends of the electric group of each vehicle with said conductors so that in whichever direction the vehicle may be placed in the train the electric group of the vehicle can be connected in circuit in the desired direction with respect to the polarity of the whole installation.

5. An electro-mechanical propulsion system for trains having a plurality of vehicles, comprising heat motors, electric machines coupled thereto, batteries working in conjunction with the electric machines, means for connecting the electric machines and batteries of each vehicle in separate groups, means for connecting the electric machines and batteries of the whole train in series, and a regulating resistance in series with each battery by which one or more of the batteries can be gradually placed in or out of circuit, the variation of the resistance being dependent upon the strength of the current.

In testimony whereof I have hereunto set my hand in presence of two subscribing witnesses.

HENRI PIEPER.

Witnesses:
  E. M. HEPBIN,
  A. DEMENE.

Copies of this patent may be obtained for five cents each, by addressing the "Commissioner of Patents, Washington, D. C."